(12) United States Patent
Devoe

(10) Patent No.: US 6,760,215 B2
(45) Date of Patent: Jul. 6, 2004

(54) CAPACITOR WITH HIGH VOLTAGE BREAKDOWN THRESHOLD

(76) Inventor: Daniel F. Devoe, 1106 Barcelona, San Diego, CA (US) 92107

( * ) Notice: Subject to any disclaimer, the term of this patent is extended or adjusted under 35 U.S.C. 154(b) by 0 days.

(21) Appl. No.: 10/413,015

(22) Filed: Apr. 14, 2003

(65) Prior Publication Data

US 2003/0231455 A1 Dec. 18, 2003

Related U.S. Application Data

(63) Continuation-in-part of application No. 10/136,789, filed on May 3, 2002, now Pat. No. 6,619,763, which is a continuation-in-part of application No. 09/865,816, filed on May 25, 2001, now Pat. No. 6,545,854.

(51) Int. Cl.[7] .......................... H01G 4/005; H01G 4/20
(52) U.S. Cl. ...................................... 361/303; 361/312
(58) Field of Search ................................. 361/302–305, 361/307–309, 311–313, 323, 306.1–306.3, 301.2–301.4

(56) References Cited

U.S. PATENT DOCUMENTS

| | | |
|---|---|---|
| 4,148,003 A | 4/1979 | Colburn et al. |
| 4,247,881 A | 1/1981 | Coleman |
| 5,177,663 A | 1/1993 | Ingleson et al. |
| 5,333,095 A | 7/1994 | Stevenson et al. |
| 5,751,539 A | 5/1998 | Stevenson et al. |
| 5,822,174 A | 10/1998 | Yamate et al. |
| 5,825,608 A | 10/1998 | Duva et al. |
| 5,870,272 A | 2/1999 | Seifried et al. |
| 5,905,627 A | 5/1999 | Brendel et al. |
| 5,926,357 A | 7/1999 | Elias et al. |
| 5,959,829 A | 9/1999 | Stevenson et al. |
| 5,973,906 A | 10/1999 | Stevenson et al. |
| 5,999,398 A | 12/1999 | Makl et al. |
| 6,008,980 A | 12/1999 | Stevenson et al. |
| 6,018,448 A | 1/2000 | Anthony |
| 6,052,272 A * | 4/2000 | Kuroda et al. ............... 361/303 |
| 6,191,931 B1 | 2/2001 | Paspa et al. |
| 6,208,501 B1 | 3/2001 | Ingalls et al. |
| 6,414,835 B1 | 7/2002 | Wolf et al. |
| 6,545,854 B2 * | 4/2003 | Trinh et al. .................. 361/302 |
| 6,619,763 B2 * | 9/2003 | Trinh et al. .................. 361/302 |

* cited by examiner

Primary Examiner—Dean A. Reichard
Assistant Examiner—Eric Thomas
(74) Attorney, Agent, or Firm—Wood, Herron & Evans, L.L.P.

(57) ABSTRACT

A high voltage capacitor has a monolithic body made of layers of dielectric material and further has first and second external contacts located on the body. First and second nonoverlapping electrodes electrically connected to the respective first and second contacts are located on respective first and second layers of dielectric material within the body. A floating electrode not connected to either of the contacts is located on a different, third layer of dielectric material. The floating electrode overlaps the first and second electrodes and forms two serially connected capacitors therewith.

29 Claims, 1 Drawing Sheet

CAPACITOR WITH HIGH VOLTAGE BREAKDOWN THRESHOLD

This application is a continuation-in-part of U.S. application Ser. No. 10/136,789, filed May 3, 2002, now U.S. Pat. No. 6,619,763, which is hereby incorporated by reference in its entirety herein, which, in turn, is a continuation-in-part of U.S. application Ser. No. 09/865,816, filed May 25, 2001, now U.S. Pat. No. 6,545,854.

FIELD OF THE INVENTION

The present invention generally concerns capacitors and more particularly, the organization of internal electrodes within a capacitor having a high voltage breakdown rating.

BACKGROUND OF THE INVENTION

The present invention relates to the placement of internal electrodes within a multi-layer capacitor made of a dielectric material such as a ceramic dielectric material. Capacitance between spaced-parallel plate regions is a function of their separation. Further, plate density cannot be particularly high in a multi-layer capacitor that relies on only a relatively thin ceramic layer to limit the breakdown voltage. Metal plate regions of alternating polarity are stacked in a parallel relationship and partially overlap each other. The metal plate regions are parallel and overlapping so as to create capacitance along the elementary model of two parallel plate electrodes. The formula for the capacitance of the conventional parallel-plate ceramic capacitor is:

$$Cap = kA/d$$

where

Cap is the capacitance in farads, k is the dielectric constant in farads per meter, A is the area of electrode overlap in square meters, and d is the distance of separation between plates in meters.

Although d would desirably be minimized for greatest capacitance, in high voltage capacitors, d cannot be indefinitely small or else the capacitor will be subject to failure from voltage breakdown of the insulating ceramic dielectric. For example, referring to FIG. 4, a known capacitor 10 having a high voltage breakdown rating has a substantially monolithic thee-dimensional body 12 comprised of layers of dielectric material 14. Conductive first electrodes 16 are placed on a first layer of dielectric material 15 and are connected to a conductive first contact 18 on an external portion of the body 12. Conductive second electrodes 20 are also placed between the same layer of dielectric material 15 and are connected to a conductive second contact 22 on another external portion of the body 12. A conductive third electrode 24 is placed on a different, second layer of dielectric material 26. The third electrode 24 is not electrically connected to either of the contacts 18, 22 and overlaps with both the first and second electrodes 16, 20. Referring to FIG. 4B, a first capacitor 28 is formed between the first and the third electrodes 16, 24, and a second capacitor 30 in a series circuit with the first capacitor 28 is formed between the second and the third electrodes 20, 24.

A typical ceramic dielectric will have a voltage rating of 100 volts per mil (0.001 in.) thickness. For example, if the capacitor 10 is designed to have an operating voltage of about 2,000 volts, an axial plate separation, that is, the thickness t of the ceramic layer 15 must be about 10 mils.

Another aspect of high voltage ceramic capacitor design relates to the distance d1 of separation between electrodes 16, 20 of opposite polarity. The plate separation d1 should be 50% greater than the layer thickness and hence the electrode separation t. This is because a voltage breakdown is more likely to occur along the unavoidable imperfections of the seams 32 between the layers 15, 17. Thus, the distance d1 should be about 15 mils, that is, 1.5×10 mils.

Capacitors so constructed use high voltages, commonly about 750 volts. When the electrodes of the capacitor are subjected to high voltages, for example, on the order of hundreds and, with safety margins, even thousands of volts, the seam 32 is subject to developing voltage breakdown paths between the electrodes 16, 20.

Thus, there is a need for an improved multilayer high voltage ceramic capacitor that has a substantially higher breakdown voltage rating.

SUMMARY OF THE INVENTION

The present invention provides a multi-layer capacitor that has a significantly higher voltage breakdown threshold than known capacitors of comparable size. The multi-layer capacitor of the present invention is especially useful in applications where higher voltages may be expected and thus, can be used in a wider range of more rigorous applications than known comparable capacitors. The multi-layer capacitor of the present invention has a construction that substantially strengthens potential voltage breakdown paths within the capacitor and thus, provides capacitors having operating voltages ranging from about 1,000 volts to 10,000 volts and higher.

According to the principles of the present invention and in accordance with one embodiment, the present invention provides a multilayer capacitor having a substantially monolithic body made of layers of dielectric material with first and second external contacts located on the body. A first electrode connected to the first contact is located on a first layer of dielectric material within the body, and a second electrode connected to the second contact is located on a second layer of dielectric material different from the first layer. The first and second electrodes are nonoverlapping with each other. A floating electrode not electrically connected either of the contacts is located on a third layer of dielectric material different from the first and second layers. The floating electrode overlaps the first and second electrodes and forms serially connected capacitors therewith. Locating the electrodes on different layers of dielectric material provides the multilayer capacitor with a higher voltage breakdown threshold than known capacitors of comparable size.

In one aspect of this invention, additional floating electrodes are located on different layers of dielectric material and provide additional serially connected capacitors to increase the voltage breakdown threshold of the multilayer capacitor.

These and other objects and advantages of the present invention will become more readily apparent during the following detailed description taken in conjunction with the drawings herein.

DETAILED DESCRIPTION OF THE INVENTION

Figure 1A:
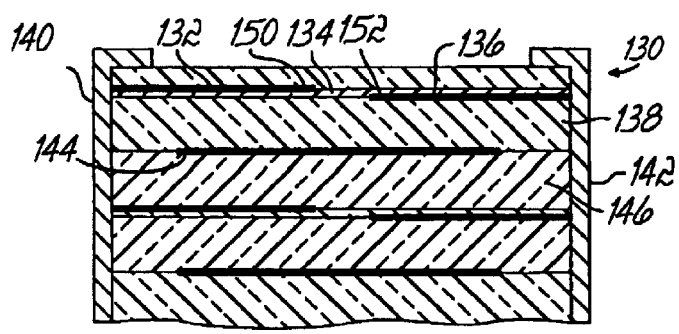
FIG. 1A is a centerline cross-sectional view of one embodiment of a multilayer capacitor having a high breakdown voltage threshold in accordance with the principles of the present invention.
Figure 4A:
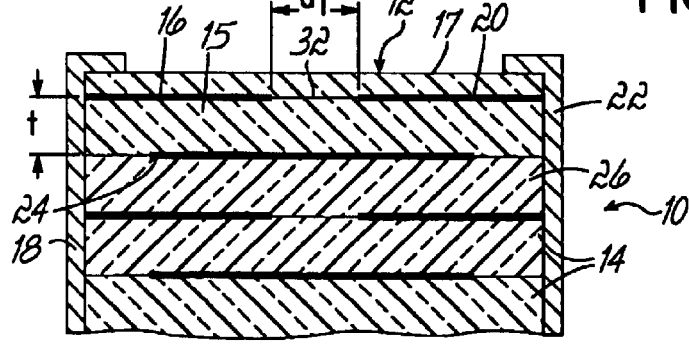
FIG. 4A is a centerline cross-sectional view of a known multilayer capacitor.
Figure 4B:
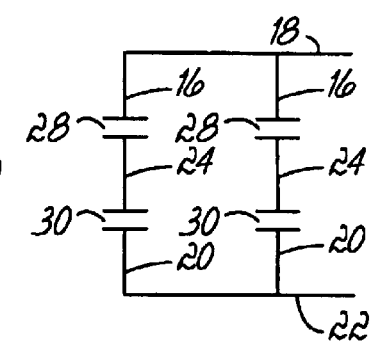
FIG. 4B is an electrical schematic diagram of the capacitor of FIG. 4A.

As described earlier, known multilayer high voltage capacitors as illustrated in FIG. 4A have a limited voltage breakdown threshold because of the potential for conduction along a seam 32 between ends of the electrodes 16, 20. To overcome that limitation, referring to FIG. 1A, a multilayer high voltage capacitor 130 has a plurality of metallized or conductive first electrodes 132 disposed on respective first layers of dielectric material 134. A plurality of conductive second electrodes 136 are disposed on respective second layers of dielectric material 138 different from the first layers 134. The first and second electrodes 132 and 136 are electrically connected to respective first and second external electrical contacts 140, 142. A plurality of conductive floating electrodes 144 are disposed on respective third layers of dielectric material 146 that are different from the first and second layers 134, 138, respectively. The floating electrodes 144 are not connected to either of the contacts 140, 142.

Figure 1B:
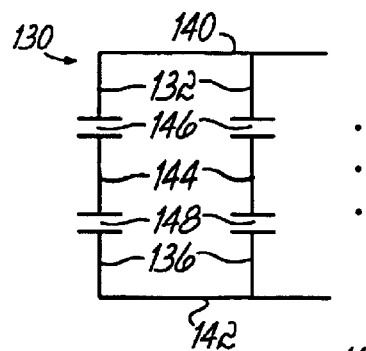
FIG. 1B is an electrical schematic diagram of the capacitor of FIG. 1A.

The first electrodes 132 are non-overlapping with the second electrodes 136; however, each of the floating electrodes 144 overlaps at least one of the first electrodes 132 and at least one of the second electrodes 136. As shown in FIG. 1B, a plurality of first capacitors 146 are formed between respective first electrodes 132 and respective floating electrodes 144. In addition, a plurality of second capacitors 148 are formed between respective floating electrodes 144 and respective second electrodes 136. The capacitors 146, 148 are connected in series between the external contacts 140, 142.

Placing the first and second electrodes 132, 136 on respectively different layers of dielectric material 134, 138, reduces the potential for conduction between ends 150, 152 of the respective electrodes 132, 136. Further, the voltage breakdown threshold between the ends 150, 152 can be controlled by varying the distance separating the ends 150, 152 and/or the thickness of the layer of dielectric material 134. Depending on the application, the thickness of the layer of dielectric material 138 is in a range of about 4–10 times the thickness of the dielectric material 134. If the voltage breakdown threshold between electrodes 132, 144 is about 1,500 volts and the voltage breakdown threshold between electrodes 136 and 144 is about 1,500 volts, then the voltage breakdown threshold rating for the high voltage capacitor 130 is about 3,000 volts.

Figure 2A:
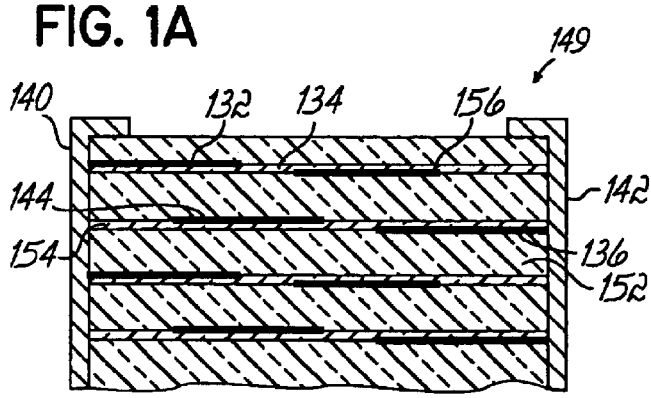
FIG. 2A is a centerline cross-sectional view of another embodiment of a multilayer capacitor having a high breakdown voltage threshold in accordance with the principles of the present invention.
Figure 2B:
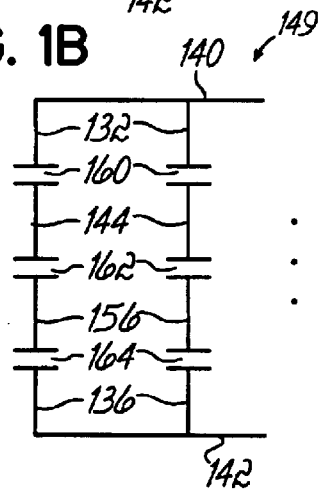
FIG. 2B is an electrical schematic diagram of the capacitor of FIG. 2A.

Higher voltage breakdown thresholds can be obtained by adding successive capacitors in series as shown in FIGS. 2A and 2B. Referring to FIG. 2A, a high voltage capacitor 149 has an external contact 140 connected to a plurality of conductive first electrodes 132 that are disposed on respective first layers of dielectric material 150. A second external contact 142 is connected to conductive second electrodes 136 that are disposed on respective layers of dielectric material 152 different from the layers 150. The first electrodes 132 are non-overlapping with the second electrodes 136. A plurality of first floating electrodes 144 are disposed on respective layers of dielectric material 154 that are different from the first layers 150 and second layers 152. A plurality of second floating electrodes 156 are disposed on respective layers of dielectric material 158 that are different from the first layers 150, second layers 152 and third layers 154. The first and second floating electrodes 144 and 156 are not connected to either of the external contacts 140, 142. However, the first floating electrode 144 overlaps both the first electrode 132 and the second floating electrode 156. Further, the second floating electrode 156 also overlaps the second electrode 136. As shown in FIG. 2B, first capacitors 160 are formed by respective first electrodes 132 and respective first floating electrodes 144. Second capacitors 162 are formed by respective first floating electrodes 144 and respective second floating electrodes 156. Third capacitors 164 are formed by respective second floating electrodes 156 and respective second electrodes 136. Respective ones of the capacitors 160, 162 and 164 are in a series circuit between the external contacts 140, 142. If each of the capacitors 160, 162, 164 has a voltage breakdown threshold of about 1,500 volts, then the high voltage capacitor 149 has a voltage breakdown threshold of about 4,500 volts.

Figure 3A:
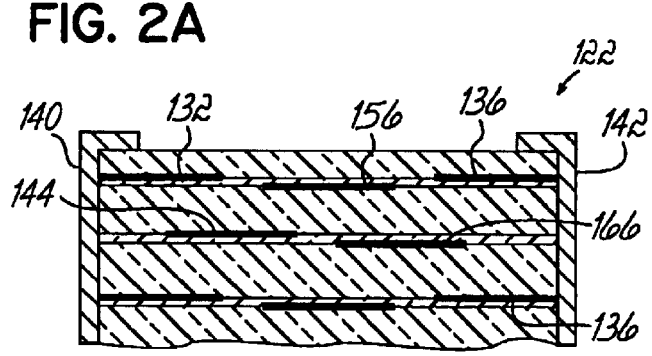
FIG. 3A is a centerline cross-sectional view of a further embodiment of a multilayer capacitor having a high breakdown voltage threshold in accordance with the principles of the present invention.
Figure 3B:
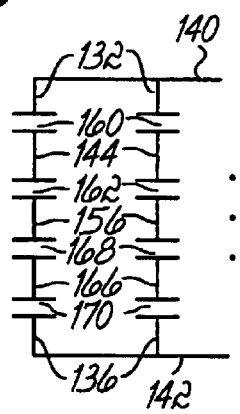
FIG. 3B is an electrical schematic diagram of the capacitor of FIG. 3A.

The voltage breakdown threshold can be increased by adding further floating electrodes, for example, as shown in FIGS. 3A and 3B, a high voltage capacitor 122 has third floating electrodes 166. Thus, a plurality of capacitors 168 are formed by respective second floating electrodes 156 and respective third floating electrodes 166. In addition, a fourth plurality of capacitors 170 are formed by respective third floating electrodes 166 and respective second electrodes 136. Respective ones of the capacitors 160, 162, 168, 170 are respective series circuits between the external contacts 140, 142. If each of the capacitors 160, 162, 168 and 170 has a voltage breakdown threshold of 1,500 volts, then the high voltage multilayer capacitor 122 has a voltage breakdown threshold of about 6,000 volts.

Thus, by placing electrodes on different layers of dielectric material within each of the capacitors 130, 149, 122, potential voltage breakdown paths within the capacitors are substantially strengthened, thereby providing capacitors with significantly higher voltage breakdown thresholds than known capacitors of comparable size. As will be appreciated, there is no limit to the number of series capacitors that can that can be formed within one chip; and capacitors having operating voltages up to about 10,000 volts and higher can be made. Further, the substantially higher breakdown voltage threshold substantially increases the range of applications in which the capacitors can reliably be used.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art, for example, in the described embodiment, the multi-layer capacitors are made of a ceramic dielectric. As will be appreciated, in an alternative embodiment, the multi-layer capacitor may be made of a plastic dielectric, for example, a MYLAR or PET plastic film. With a plastic film dielectric, the electrodes are often made of aluminum or silver; and the structure is glued together and not sintered. Further, as will be appreciated, the shape of the multi-layer capacitor can vary depending on a particular application.

Therefore, the invention in its broadest aspects is not limited to the specific detail shown and described.

Consequently, departures may be made from the details described herein without departing from the spirit and scope of the claims which follow.

What is claimed is:

1. A high voltage capacitor comprising:
   a substantially monolithic body of layers of dielectric material; and
   at least first, second and third conductive electrodes disposed on respectively different first, second and third layers of dielectric material within the body, the first and second electrodes being nonoverlapping with each other, but the first electrode overlapping the third electrode to form a first capacitor therebetween and the third electrode overlapping the second electrode to form a second capacitor therebetween in a series circuit with the first capacitor.

2. The high voltage capacitor of claim 1 wherein each of the first capacitor and the second capacitor has a voltage breakdown threshold of about 1,500 volts to provide the high voltage capacitor with a voltage breakdown threshold of about 3,000 volts.

3. The high voltage capacitor of claim 1 wherein the first layer of dielectric material separates the first electrode and the second electrode; and the second layer of dielectric material separates the second electrode and the third electrode.

4. The high voltage capacitor of claim 3 wherein the second layer of dielectric material has a thickness greater than a thickness of the first layer.

5. The high voltage capacitor of claim 4 wherein the thickness of the second layer is in a range of about 4–10 times the thickness of the first layer.

6. The high voltage capacitor of claim 1 wherein the dielectric material is a ceramic material.

7. The high voltage capacitor of claim 1 wherein the dielectric material is a plastic material.

8. The high voltage capacitor of claim 7 wherein the plastic material is a plastic film material.

9. The high voltage capacitor of claim 8 wherein the first electrode, the second electrode and the third electrode are made from a material selected from the group consisting of aluminum and silver.

10. A high voltage capacitor comprising:
    a substantially monolithic body of layers of dielectric material;
    a conductive first contact disposed externally on the body;
    a conductive second contact disposed externally on the body;
    a conductive first electrode electrically connected to the first contact and disposed on a first layer of dielectric material within the body;
    a conductive second electrode electrically connected to the second contact and disposed on a successive second layer of dielectric material, the second electrode being nonoverlapping with the first electrode; and
    a conductive third electrode not electrically connected to the first contact and the second contact, the third electrode being disposed on a successive third layer of dielectric material and the second electrode.

11. The high voltage capacitor of claim 10 further comprising a circuit comprising a first capacitor formed between the first electrode and the third electrode, and a second capacitor formed between the second electrode and the third electrode and connected in series with the first capacitor.

12. The high voltage capacitor of claim 10 wherein the second layer has a thickness greater than a thickness of the first layer.

13. A high voltage capacitor comprising:
    layers of dielectric material forming a substantially monolithic body having an external surface;
    a conductive first contact formed over one portion of the external surface;
    a conductive second contact formed over another portion of the external surface;
    overlapping first electrodes electrically connected to the first contact and disposed on respective first layers of the dielectric material;
    overlapping second electrodes electrically connected to the second contact and disposed on respective second layers of the dielectric material different from the first layers, none of the second electrodes overlap any of the first electrodes; and
    overlapping third electrodes not electrically connected to either the first contact or the second contact and disposed on respective third layers of the dielectric material different from the first layers and the second layers, each of the third electrodes overlapping at least one of the first electrodes and at least one of the second electrodes.

14. The high voltage capacitor of claim 13 further comprising a plurality of circuits, each circuit comprising a first capacitor formed between one of the first electrodes and one of the third electrodes, and a second capacitor formed between one of the second electrodes and one of the third electrodes and connected in series with the first capacitor.

15. The high voltage capacitor of claim 13 wherein the second layers have a thickness greater than a thickness of the first layers.

16. The high voltage capacitor of claim 13 wherein the first layers, the second layers and the third layers comprise sets of successive first, second and third layers.

17. A high voltage capacitor comprising:
    layers of dielectric material forming a substantially monolithic body having an external surface;
    a first electrode contact formed over one portion of the external surface;
    a second electrode contact formed over another portion of the external surface;
    a first electrode electrically connected to the first electrode contact and disposed on respective first layer of the dielectric material;
    a second electrode not electrically connected to either the first electrode contact or the second electrode contact, the second electrode being disposed on a second layer of the dielectric material different from the first layer, and the second electrode being substantially nonoverlapping with the first electrode;
    a third electrode not electrically connected to either the first electrode contact or the second electrode contact, the third electrode disposed on a third layer of the dielectric material different from the first layer and the second layer, and the third electrode overlapping the first electrode and the second electrode; and
    a fourth electrode electrically connected to the second electrode contact and disposed on a fourth layer of the dielectric material different from the first layer, the second layer and the third layer, the fourth electrode overlapping the second electrode and being substantially nonoverlapping with the first electrode and the third electrode.

18. The high voltage capacitor of claim 17 further comprising a circuit comprising a first capacitor formed between the first electrode and the third electrode, a second capacitor formed between the second electrode and the third electrode and connected in series with the first capacitor, and a third capacitor formed between the second electrode and the fourth electrode and connected in series with the first capacitor and the second capacitor.

19. The high voltage capacitor of claim 18 wherein each of the first capacitor, the second capacitor and the third capacitor has a voltage breakdown threshold of about 1,500 volts to provide the high voltage capacitor with a voltage breakdown threshold of about 4,500 volts.

20. The high voltage capacitor of claim 17 wherein the second layer and the fourth layer have a thickness greater than a thickness of the first layer and the third layer.

21. The high voltage capacitor of claim 17 wherein the first layer, the second layer, the third layer and the fourth layer are successive layers.

22. A high voltage capacitor comprising:
layers of dielectric material forming a substantially monolithic body having an external surface;
a first electrode contact formed over one portion of the external surface;
a second electrode contact formed over another portion of the external surface;
overlapping first electrodes electrically connected to the first electrode contact and disposed on respective first layers of the dielectric material;
overlapping second electrodes not electrically connected to either the first electrode contact or the second electrode contact, the second electrodes being disposed on respective second layers of the dielectric material different from the first layers, and the second electrodes being substantially nonoverlapping with the first electrodes;
overlapping third electrodes not electrically connected to either the first electrode contact or the second electrode contact, the third electrodes disposed on respective third layers of the dielectric material different from the first layers and the second layers, and the third electrodes overlapping at least one of the first electrodes and at least one of the second electrodes; and
overlapping fourth electrodes electrically connected to the second electrode contact and disposed on respective fourth layers of the dielectric material different from the first layers, the second layers and the third layers, the fourth electrodes overlapping at least one of the second electrodes and being substantially nonoverlapping with the first electrodes and the third electrodes.

23. The high voltage capacitor of claim 22 further comprising a plurality of circuits, each circuit comprising a first capacitor formed between the first electrode and the third electrode, a second capacitor formed between the second electrode and the third electrode and connected in series with the first capacitor, and a third capacitor formed between the second electrode and the fourth electrode and connected in series with the first capacitor and the second capacitor.

24. The high voltage capacitor of claim 22 wherein the second layers and the fourth layers have a thickness greater than a thickness of the first layers and the third layers.

25. The high voltage of capacitor 22 wherein the first layers, the second layers, the third layers and the fourth layers comprise sets of successive first, second, third and fourth layers.

26. A high voltage capacitor comprising:
layers of dielectric material forming a substantially monolithic body having an external surface;
a first electrode contact formed over one portion of the external surface;
a second electrode contact formed over another portion of the external surface;
overlapping first electrodes electrically connected to the first electrode contact and disposed on respective first layers of the dielectric material;
overlapping second electrodes electrically connected to the second electrode contact and disposed on the first layers and spaced apart from the first electrodes;
overlapping third electrodes not electrically connected to either the first electrode contact or the second electrode contact, the third electrodes being disposed on respective second layers of the dielectric material different from the first layers, and the third electrodes being substantially nonoverlapping with the first electrodes and the second electrodes;
overlapping fourth electrodes not electrically connected to either the first electrode contact or the second electrode contact, the fourth electrodes disposed on respective third layers of the dielectric material different from the first layers and the second layers, and the fourth electrodes overlapping at least one of the first electrodes and at least one of the third electrodes; and
overlapping fifth electrodes not electrically connected to either the first electrode contact or the second electrode contact, the fifth electrodes disposed on respective fourth layers of the dielectric material different from the first layers, the second layers and the third layers, and the fifth electrodes overlapping at least one of the second electrodes and at least one of the third electrodes.

27. The high voltage capacitor of claim 26 further comprising a plurality of circuits, each circuit comprising a first capacitor formed between the first electrode and the fourth electrode, a second capacitor formed between the fourth electrode and the third electrode and connected in series with the first capacitor, a third capacitor formed between the third electrode and the fifth electrode and connected in series with the first capacitor and the second capacitor and a fourth capacitor formed between the fifth electrode and the second electrode and connected in series with the first capacitor, the second capacitor and the third capacitor.

28. The high voltage capacitor of claim 27 wherein the second layers and the fourth layers have a thickness greater than a thickness of the first layers and the third layers.

29. The high voltage capacitor of claim 27 wherein the first layers, the second layers, the third layers and the fourth layers comprise sets of successive first, second, third and fourth layers.

* * * * *

UNITED STATES PATENT AND TRADEMARK OFFICE
CERTIFICATE OF CORRECTION

PATENT NO. : 6,760,215 B2 Page 1 of 1
DATED : July 6, 2004
INVENTOR(S) : Daniel F. Devoe It is certified that error appears in the above-identified patent and that said Letters Patent is hereby corrected as shown below:

<u>Column 8,</u>
Line 1, change "The high voltage of capacitor 22 wherein the..." to -- The high voltage capacitor of claim 22 wherein the... --

Signed and Sealed this

Fourth Day of January, 2005

JON W. DUDAS
*Director of the United States Patent and Trademark Office*